United States Patent

Freeman

[11] Patent Number: 6,049,560
[45] Date of Patent: Apr. 11, 2000

[54] INDUCTIVELY HEATED SIDE DRAIN FOR HIGH TEMPERATURE MOLTEN MATERIALS

[76] Inventor: Charles John Freeman, 628 N. Ely Pl., Kennewick, Wash. 99336

[21] Appl. No.: 09/205,146

[22] Filed: Dec. 3, 1998

[51] Int. Cl.$^7$ ....................................................... F27D 3/00
[52] U.S. Cl. .................................. 373/142; 373/7; 373/59
[58] Field of Search ..................................... 373/142, 143, 373/144, 146, 163, 59, 7, 4

[56] References Cited

U.S. PATENT DOCUMENTS

| 3,472,942 | 10/1969 | Campbell | 373/142 |
| 5,809,057 | 9/1998 | Benz et al. | 373/142 |
| 5,901,169 | 5/1999 | Kobayashi | 373/142 |

Primary Examiner—Tu Ba Hoang

[57] ABSTRACT

An inductively heated drain tube fashioned of high temperature, electrically conducting materials is disclosed. An inductor surrounds the drain tube. The inductor and drain tube are cast within a refractory material. The drain tube is then placed in communication with the side of a bath of molten materials. When power is supplied to the inductor, the inductor couples with the drain tube, heating the drain tube and allowing it to act as a drain for high temperature molten materials. When power is removed from the inductor, a flow of cooling liquid through the inductor cools the drain tube, solidifying the molten materials and stopping their flow through the drain tube. The refractory material encases the inductor, acting as a thermal barrier and preventing damage from molten materials.

9 Claims, 1 Drawing Sheet

6,049,560

1

INDUCTIVELY HEATED SIDE DRAIN FOR HIGH TEMPERATURE MOLTEN MATERIALS

FIELD OF THE INVENTION

The present invention relates generally to an apparatus and method for removing high temperature molten materials from a molten bath. More specifically, the present invention relates to inductively heating a drain tube fashioned of electrically conducting materials, wherein the drain tube and the inductor are cast within a refractory material, and placed in communication with the side of a bath of high temperature molten materials to act as a drain for the molten materials.

BACKGROUND OF THE INVENTION

Increased environmental concerns have created a demand for new and better methods for treating a great variety of waste streams. Of particular concern are waste streams which contain constituents known to damage human health or ecosystems, such as hazardous metals, radioactive materials, hazardous organic compounds, and combinations of the like. If ingested, even low levels of many of these materials have been shown to have adverse and tragic effects on both human health, as well as the health of plants and animals in exposed ecosystems. Unfortunately, these hazardous materials are present in a great variety of industrial and consumer products, or as a by-product incident to the manufacture of industrial and consumer products or other industrial processes. Also, often times many of these hazardous substances will exist in a mixture with other, more benign waste, necessitating either costly separation of the wastes, or introducing complications for treatment of the aggregate through means such as incineration.

In many cases these hazardous substances are, or through decomposition or treatment means such as incineration may become, highly soluble in ground water or directly released into the air, greatly increasing the likelihood of their eventual introduction into, and migration within, the environment. Many of these hazardous compounds will remain in the environment in a hazardous condition indefinitely. Others will actually accumulate and concentrate through ecological mechanisms, increasing their potency. Thus, preventing the introduction of a great variety of hazardous materials and mixtures into the environment presents a great challenge for the human race, as a failure to find safe and effective waste treatment and disposal methods promises to have far reaching and disastrous consequences.

One particular strategy for safe and effective treatment and storage of such hazardous materials is "vitrification." Materials are vitrified when they are combined with glass forming materials and heated to high temperatures. In this manner, many of the hazardous constituents, such as hazardous organic compounds, are destroyed by the high temperatures, and may actually be recovered as clean burning fuels and converted into energy. In addition to the recovery of these clean burning fuels, when properly constructed, vitrification processes may be designed to reduce total gas emissions to a fraction of the levels associated with incineration, greatly simplifying gas cleanup and energy recovery. Other hazardous constituents, which are able to withstand the high temperatures without becoming volatilized, may be made to form into a molten state which then cools to form a stable glass. By carefully controlling the vitrification process, the resulting vitrified glass may be made to demonstrate great stability against chemical and environmental attack, with a high resistance to leaching of the hazardous components bound up within the glass. Hazardous constituents not converted to energy by the vitrification process are thus bound within the resulting glass, preventing the release of both into the environment or groundwater where they may be ingested by humans and wildlife. Thus, a great advantage of vitrification as a waste treatment option is vitrification's ability to treat a great variety of waste streams, including hazardous waste streams, simultaneously and satisfactorily.

Several techniques for vitrifying materials have arisen as the advantages of vitrification have become apparent and problems related to each particular approach have been addressed. The use of high temperatures and the formation of glass in the development of vitrification technologies has insured that practitioners have borrowed methods and techniques from both the metallurgical and steel making fields as well as the glass making field. In particular, the use of a variety of different heating methods and sources, as well as the use and development of refractory materials, have been critical aspects of the success of many of these vitrification processes. Common to many of these arts is a need for drain systems to remove molten materials from refractory lined heating vessels. Due to the high temperatures associated with the material, the drain through which the molten material flows in any high temperature process is subject to high levels of corrosive and mechanical wear. The chemical properties of the molten materials passing through the drain may also be particularly corrosive, exacerbating the problem.

As vitrification technologies for the treatment of waste have progressed, one interesting development has been the ability to separate and recover valuable metals contained within the various waste streams. When waste containing certain valuable metals is vitrified under the correct conditions, the metals, or a portion thereof, can be made to be insoluble in the vitreous glass which forms. In this manner, the metals will separate from the vitreous glass, and the two will form separate layers within the vitrification chamber. Just as oil will float on water, the molten vitreous glass may separate above the molten metals contained within vitrification chamber. Not surprisingly, separating the molten glass layer from the molten metal layer can present quite a challenge. Draining the materials away from each other requires separate drains for the two layers; one placed in the bottom of the heating vessel and one placed in the side wall of the heating vessel. It is also necessary that the drains be controlled, that is, the flow of the molten materials must be stopped and started, yet the drains must also be to operate in the extremely hostile environment. Prior art drain systems have also suffered from clogging. For example, in many systems it is desirable to limit the flow of the molten material at some predetermined maximum level. This may be accomplished by limiting the circumference of the aperture in the drain tube. Problems arise when chunks of waste materials which have not been completely rendered into a molten state clog these drain tubes. These and other requirements have created a need for better drains to handle the flow of molten materials generated in high temperature applications such as vitrification waste treatment schemes.

SUMMARY OF THE INVENTION

Accordingly, the present invention is an improved drain system for high temperature applications which takes advantage of materials which are electrically conductive, yet also highly resistant to corrosive and mechanical wear caused by contact with a variety of molten materials. These materials are fashioned into a drain tube. As used herein, a "drain tube" is simply a section of material with an aperture or passageway through which molten materials may flow. Preferably, a drain tube is a simple cylinder wherein the flow of molten materials is through the center of the cylinder. By positioning these drain tubes at the sides of a bath of molten material, larger circumference apertures than those employed in the bottom drains of the prior art may be utilized without unduly increasing the flow of molten materials.

An inductor is first wound about the exterior of the drain tube. The inductor and the drain tube are then contained within a ceramic refractory material, typically by casting the materials within the ceramic. The ceramic is preferably selected as a refractory material, able to withstand contact with high temperature molten materials. For example and while not to be construed as limiting, ceramic materials formed of alumina, magnesia, zirconia, silica, titania, and combinations thereof are suitable for use in accordance with the present invention. The drain tube is made from electrically conductive materials such as platinum, molybdenum, inconel, graphite or silicon carbide/carbon and graphite, preferably in a mixture with refractory materials. Preferred drain tube materials include graphite and a mixture of between about 10 and 30 weight percent silicon carbide/carbon and between about 70 and 90 weight percent alumina. The inductor is preferably fashioned of copper tubing, containing a flow of a cooling fluid, such as water. While the present invention was initially developed for applications in waste vitrification, it will be apparent to those having skill in the art that the present invention is useful in any application where there is a need to drain in a controlled fashion high temperature molten materials, be they glasses, metals, wastes or other materials.

In a preferred embodiment of the present invention, the drain is opened by placing a high frequency alternating current across a hollow tube wound in a coil to act as an inductor. The inductor surrounds the drain tube, thereby causing the drain tube to heat. Once the drain tube reaches a critical high temperature, molten materials within the drain tube will then flow through the drain tube without solidifying. The specific critical high temperature for any particular drain tube is determined by the characteristics of the molten material flowing through the drain tube. At the same time the high frequency alternating current is applied, a cooling fluid such as water is circulated through the inductor preventing the inductor, which is preferably fashioned of copper but may be any conductive material, from melting. By removing the high frequency alternating current, the drain tube will then begin to cool. The circulating water will continue to act as a heat sink, accelerating the cooling process. When the drain tube reaches some critical low temperature, molten materials flowing within the tube will solidify, causing the flow molten materials to cease. The specific critical low temperature for any particular drain is again determined by the characteristics of the molten material flowing through the drain. In this manner, the drain may be closed. To prevent the flow of molten materials from circumventing the drain tube, and possibly damaging the inductor, both the drain tube and the inductor are contained within a ceramic refractory material. Preferably, the drain tube and the inductor are held in position such that the inductor is coiled about the drain tube, although not touching its surface. The drain tube and inductor are then encased within a refractory, preferably by casting the inductor and the drain tube within the refractory, which binds to the outer surface of the drain tube at the same time encasing the inductor. Surprisingly, the applicant herein has discovered that the cooling and heating of the drain tube will occur rapidly despite the thermal barrier created by the refractory material, allowing the drain to open and close depending upon the application of the current. As will be apparent to those having skill in the art, a great many methods for encasing the inductor and the drain tube within the refractory are acceptable; casting is selected as a preferred method due to the ease of construction. Alumina is preferred as the refractory, due to the ease with which alumina may be cast and the high temperature refractory properties of alumina.

Thus constructed, the drain may be positioned as an integral part of a refractory chamber containing molten materials, and thus positioned, operated as a side drain for the molten materials.

OBJECTS

Accordingly, it is an object of the present invention to provide an improved drain for high temperature applications.

It is a further object of the present invention to provide a drain tube fashioned of an electrically conductive material such as silicon carbide/carbon or graphite, preferably in a mixture with refractory materials, surrounded by an inductor, wherein the inductor and the drain tube are set within a ceramic refractory material.

It is a further object of the present invention to provide an inductively heated drain tube in communication with the side of a bath of molten material to allow the removal of the material through a large aperture in the drain tube without having an unacceptably high rate of flow of the molten materials.

It is a further object of the invention that the ceramic refractory material be selected from alumina, magnesia, zirconia, silica, titania, and combinations thereof.

It is a further object of the present invention that the drain tube be provided using a mixture of between about 10 and 30 weight percent silicon carbide/carbon and between about 70 and 90 weight percent alumina.

It is a further object of the present invention that the drain tube be provided using platinum, molybdenum, inconel, or graphite.

It is a further object of the present invention to provide the inductor fashioned of a hollow tube, containing a flow of a cooling liquid.

These and other objects of the present invention are particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
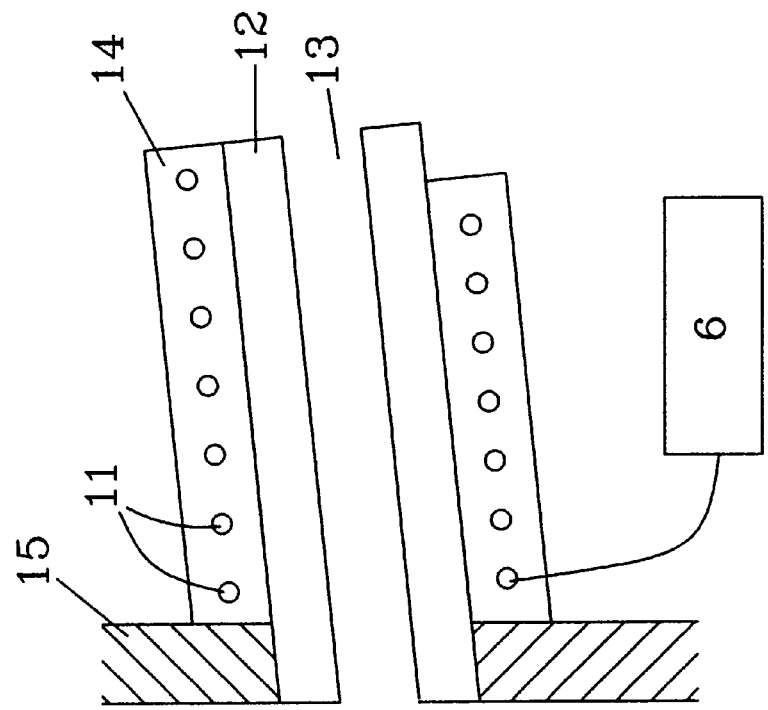
FIG. 1 is a cut away, schematic view of a first prototype side drain built to demonstrate a preferred embodiment of the present invention.

A pair of side drains were constructed and tested to demonstrate two preferred embodiments of the present invention. As depicted in FIG. 1, the one such side drain was constructed by fashioning an inductor 1 from a section of ⅜" (outside diameter) hollow round copper tubing. The inductor 1 was given 7 turns with an internal diameter of approximately 5". A cylindrical drain tube 2 constructed of graphite and purchased from UCAR Carbon Company, Inc. of Chicago Ill., measuring 10" in length with a 3" outside diameter was inserted within the interior of the inductor 1. A 1" diameter drain hole 3 down the center axis of the drain tube 2 allowed the passage of molten material through the drain. The drain tube 2 and inductor 1 were then cast within alumina refractory 4 such that the drain tube 2 and inductor 1 were not in contact with one and another. All of the coils of the inductor 1 were encased within the refractory 4. The top of the drain tube 2 was then placed at the side 5 of the melt chamber (not shown) of a vitrification system built by Integrated Environmental Technologies of Richland, Wash. The assembly was oriented such that the drain tube was angled downwardly at a 14° slope from the horizon. Each end of the inductor 1 was then attached to a high frequency power supply built by Inductoheat, Inc. of Madison Heights Mich. Water was circulated through the inductor 1 at the rate of approximately 2 ½ gallons per minute. A molten glass was established within the melt chamber at a temperature of approximately 1350°0 C. The glass consisted of the following approximate composition in weight percentages:

| | |
|---|---|
| $SiO_2$ | 74.5 |
| $Na_2O$ | 13.3 |
| CaO | 8.7 |
| MgO | 3.9 |
| $Al_2O_3$ | 0.4 |
| $Fe_2O_3$ | 0.3 |
| $SO_3$ | 0.2. |

Before a current was applied to inductor 1 no glass poured through the drain. Then, power supply 6 applied a 25 kW load at between 20 and 30 kHz. Within about ten minutes, a flow of molten material was established through drain hole 3. Thereafter, power supply 6 was discontinued while maintaining the flow of water through inductor 1. Within about six minutes, the flow of molten materials stopped as the glass had solidified within the drain tube 3.

Figure 2:
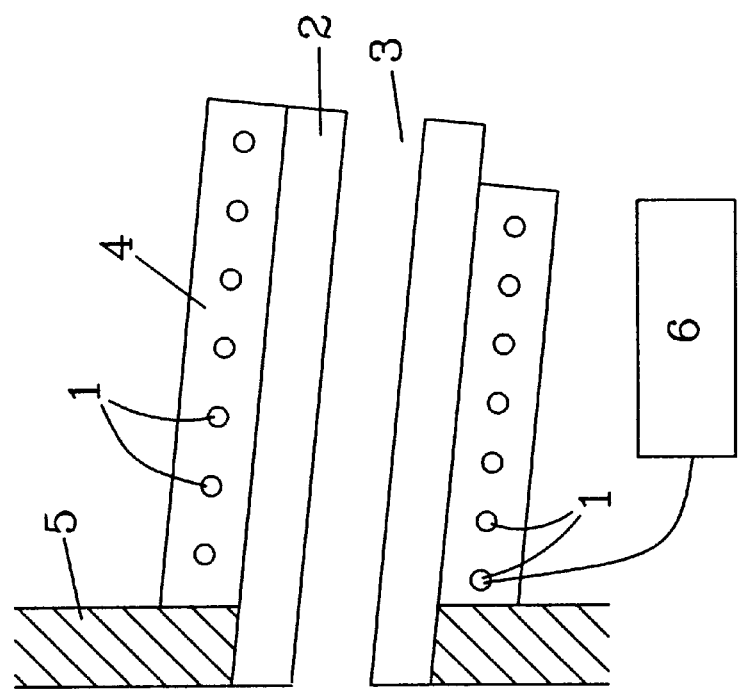
FIG. 2 is a cut away, schematic view of a second prototype side drain built to demonstrate a preferred embodiment of the present invention.

As depicted in FIG. 2, a second side drain was constructed by fashioning an inductor 11 from a section of ⅜" (outside diameter) hollow round copper tubing. The inductor 11 was given 7 turns with an internal diameter of approximately 5". A cylindrical drain tube 12 constructed of approximately 75% Al2O3, 20% SiC+C, 3% SiO2, and 2% CaO, and purchased from North American Refractories Company of Cleveland, Ohio, measuring 10" in length with a 3" outside diameter was inserted within the interior of the inductor 11. A 1" diameter drain hole 13 down the center axis of the drain tube 12 allowed the passage of molten material through the drain. The drain tube 12 and inductor 11 were then cast within alumina refractory 14 such that the drain tube 12 and inductor 11 were not in contact with one and another. All of the coils of the inductor 11 were encased within the refractory 14. The lower end of the drain tube 12 was then placed flush against the side 15 of the melt chamber (not shown) of a vitrification system built by Integrated Environmental Technologies of Richland, Wash. The assembly was oriented such that the drain tube was angled upwardly at a 14° slope from the horizon. Each end of the inductor 11 was then attached to the high frequency power supply 6. Water was circulated through the inductor 11 at the rate of approximately 2 ½ gallons per minute. A molten glass having the same approximate composition of the molten glass used to demonstrate the prototype of the previous example was established within the melt chamber at a temperature of approximately 1200° C.

Before a current was applied to inductor 11 no glass poured through the side drain. Then, power supply 6 applied a 25 kW load at between 20 and 30 kHz. Within about twenty minutes, a flow of molten material was established through drain hole 13. Thereafter, power supply 6 was discontinued, while maintaining the flow of water through inductor 11. Within about six minutes, the flow of molten materials stopped as the glass had solidified within the drain tube 3.

The inductively heated drain tubes of the present invention can be used with various vitrification systems. Exemplary systems include, but are not limited to, those illustrated in U.S. Pat. Nos. 5,666,891; 5,798,497; 5,756,957; and 5,811,752; all of which are incorporated herein by reference. Additional systems suitable for use with the inductively heated drain tubes of the present invention include those disclosed in commonly owned copending U.S. patent application Ser. Nos. 08/693,425, filed Aug. 7, 1996 and 09/039,580, filed Mar. 16, 1998. The entire contents of U.S. patent application Ser. Nos. 08/693,425 and 09/039,580 are incorporated herein by reference.

While a preferred embodiment of the present invention has been shown and described, it will be apparent to those skilled in the art that many changes and modifications may be made without departing from the invention in its broader aspects. For example and while not to be construed as limiting, drain tubes in accordance with the present invention are preferably constructed in the form of cylinders such that molten materials can flow through the centers of the cylinders. It will be appreciated by those skilled in the art, however, that other constructions can be utilized in accordance with the teachings of the present invention. The appended claims are therefore intended to cover all such changes and modifications as fall within the true spirit and scope of the invention.

I claim:

1. An inductively heated drain for molten materials comprising an inductor surrounding an electrically conductive drain tube, the inductor and the drain tube set within a ceramic and in communication with the side of a bath of molten materials.

2. The inductively heated drain of claim 1 wherein the ceramic comprises a ceramic selected from the group consisting of alumina, magnesia, zirconia, silica, titania, and combinations thereof.

3. The inductively heated drain of claim 1 wherein the electrically conductive drain tube is made from materials comprising silicon carbide/carbon, platinum, molybdenum, inconel, graphite, and mixtures of silicon carbide/carbon, platinum, molybdenum, inconel, and graphite with refractory materials, and combinations thereof.

4. The inductively heated drain of claim 3 wherein the electrically conductive drain tube is made from materials comprising between 10 and 30 weight percent silicon carbide/carbon and between about 70 and 90 weight percent refractory materials.

5. The inductively heated drain of claim 4 wherein the refractory materials comprise alumina.

6. The inductively heated drain of claim 1 wherein the electrically conductive drain tube is made from materials comprising graphite.

7. The inductively heated drain of claim 1 wherein the inductor comprises a hollow metal tube containing a flow of a cooling fluid.

8. The inductively heated drain of claim 7 wherein the cooling fluid is water.

9. The inductively heated drain of claim 1 wherein the aperture in the drain tube is at least one inch in diameter.

* * * * *